June 14, 1960 W. W. FUNK 2,940,209
APPARATUS FOR DISTRIBUTING AGRICULTURAL CHEMICALS
Filed Dec. 23, 1957 9 Sheets-Sheet 1

INVENTOR
WELKER W. FUNK
BY Hans G. Hoffmeister
ATTORNEY

June 14, 1960

W. W. FUNK 2,940,209

APPARATUS FOR DISTRIBUTING AGRICULTURAL CHEMICALS

Filed Dec. 23, 1957

INVENTOR
WELKER W. FUNK

BY Hans G. Hoffmeister
ATTORNEY

June 14, 1960  W. W. FUNK  2,940,209
APPARATUS FOR DISTRIBUTING AGRICULTURAL CHEMICALS
Filed Dec. 23, 1957  9 Sheets-Sheet 9

INVENTOR
WELKER W. FUNK
BY Hans G. Hoffmeister
ATTORNEY

United States Patent Office 2,940,209
Patented June 14, 1960

2,940,209

APPARATUS FOR DISTRIBUTING AGRICULTURAL CHEMICALS

Welker W. Funk, Moline, Ill., assignor to Food Machinery and Chemical Corporation, San Jose, Calif., a corporation of Delaware Filed Dec. 23, 1957, Ser. No. 704,759

10 Claims. (Cl. 43—148)

This invention appertains to apparatus for distributing agricultural chemicals and more particularly relates to an apparatus for applying pesticide, fungicide, or the like, in the form of sprays and dusts.

To meet the requirements of farmers and orchardists, working small and medium size farms, a versatile pesticide and fungicide applicator is needed which may be easily and readily adjusted to vary the discharge pattern and the direction of discharge of the pesticide or fungicide and to treat many types of crops with different varieties and concentrations of pesticide or fungicide. Thus, such an applicator must be capable of spraying, dusting, and applying both spray and dust at the same time in an operation which will hereinafter be referred to as liqui-dusting. The applicator should also be adaptable for use in orchards and in fields utilized for row crop operations.

It is, therefore, one object of the present invention to provide an improved versatile apparatus for distributing agricultural chemicals to both orchards and row crops.

Another object is to provide a distributing apparatus having improved means for metering and directing powdered material into an air stream for even distribution of the powdered material.

Another object is to provide an improved metering device which is arranged to fluidize powdered material prior to discharging the same for entrainment in an air stream.

Another object is to provide a pesticide distributing apparatus having an improved discharge head.

Another object is to provide a pesticide distributing apparatus having improved means for shifting the discharge head laterally, which shifting means is operable from a position spaced from the discharge head.

These and other objects and advantages of the present invention will become apparent from the following description and the drawings, in which:

Fig. 4 is an enlarged vertical section taken along lines 4—4 of Fig. 2.

Fig. 5 is a section taken along lines 5—5 of Fig. 4.

Figure 1:
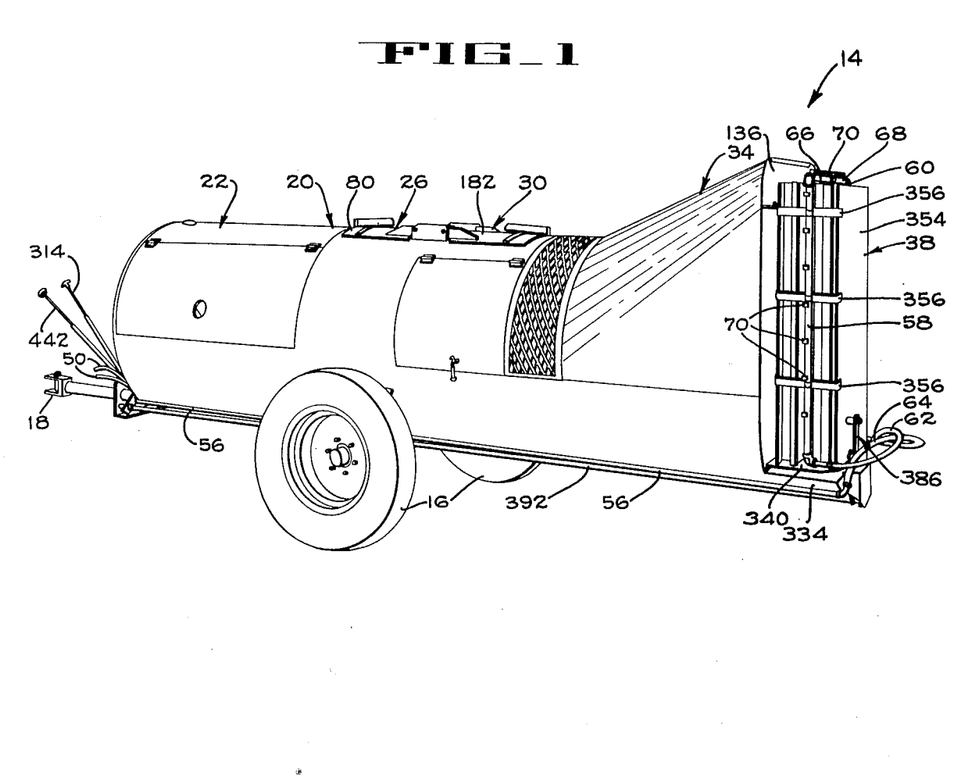
Fig. 1 is a perspective of the apparatus of the present invention.

The pesticide distributing apparatus 14 (Figs. 1 and 2) of the present invention is in the form of a mobile unit adapted to be drawn by a tractor (not shown) through the orchard or field to be treated, and has its controls so positioned as to be easily reached and operated by the tractor driver. The apparatus 14 is mounted on wheels 16 (Figs. 1 and 2) in a conventional manner and may be connected to the tractor by a drawbar 18. The pesticide distributing apparatus 14 generally comprises an elongated main body 20 of tubular construction which is divided into an engine compartment 22 having an engine 24 therein, a liquid supply section 26 having a liquid supply tank 28 therein, a dust supply section 30 having a dust hopper 32 therein, and a blower compartment 34 having a blower 36 therein. A discharge head 38 is mounted for lateral movement behind the blower compartment 34. These different parts of the pesticide distributing apparatus 14 can be arranged so that the apparatus acts as a sprayer, a duster, or a liqui-duster. Also, the discharge head 38 can be adjusted so that the pesticide will be directed up and outwardly or down and outwardly from both sides of the apparatus simultaneously, or from only one side of the apparatus at a time.

A self-priming spray pump 40 (Fig. 2) is mounted within the engine compartment 22 and is driven by the engine 24 through a belt drive 42. The pump 40 draws liquid from the tank 28 through a suction conduit 44 and forces the liquid under pressure through a discharge pipe 46 which is connected to one end of a pair of flexible hoses 48 and 50. The flexible hoses 48 and 50 each have a valve 52 (only one being shown) adjacent their midpoints. The hoses are of sufficient length to allow the valves 52 to be clamped on the seat of the tractor (not shown) by any suitable means while one end of each hose 48 and 50 is connected to longitudinally extending pipes 54 and 56 (Fig. 6), respectively. The pipes 54 and 56 extend the full length of the main body 20 and are connected at the rear of the body to a pair of vertically extending headers 58 and 60 (Figs. 1 and 3), respectively, by a pair of hoses 62 and 64. The vertical headers 58 and 60 are mounted on opposite sides of the discharge head 38 and are connected to horizontal header extensions 66 and 68 (Fig. 1), respectively, which are directed towards each other with each extension projecting inwardly approximately one half of the width of the head 38. Both the headers 58 and 60 and their horizontal extensions 66 and 68 are provided with a plurality of spray nozzles 70 which discharge the high pressure fluid rearwardly of the apparatus 14. Each of the two valves 52 (only one being shown) can be regulated by the operator independently of the other to control the amount of spray emitted from the nozzles 70 on either side of the apparatus.

The liquid supply tank 28 (Fig. 2) is easily filled from a pond or other water source by utilizing the suction of the pump 40. In order to use the pump 40 to fill the tank 28, the operator must connect a suction hose (not shown) into a hose fitting 72 in the suction conduit 44, and then close a valve 74 in the suction conduit 44 between the hose fitting 72 and the tank 28. Water drawn through the suction hose (not shown) by the pump 40 flows into the tank 28 through a by-pass conduit 76 which is connected between the tank 28 and the discharge pipe 46. The valves 52 must be closed and a valve 78 interposed in the by-pass conduit 76 must be open when the tank 28 is being filled. As the tank is being filled, a powdered or liquid insecticide is added to the water in the tank 28 through a door 80 provided for this purpose. The 
water entering the tank 28 will help mix and evenly distribute the insecticide throughout the tank 28. In order to maintain the material in the tank 28 in a properly mixed state after the tank has been filled and the valve 78 has been closed, an agitator 82 is rotatably mounted in the lower portion of the tank 28. The agitator 82 is driven by the engine 24 through a chain drive 84 and other drive means which will be described in greater detail later.

The blower 36 (Fig. 2) is connected to the output shaft 94 of the engine 24 by means of a drive shaft 96 and two universal joints 98 and 100. The universal joint 98 is connected to the output shaft 94 while the universal joint 100 is connected to the shaft 102 of the blower 36. As clearly shown in Fig. 2, the drive shaft 96 projects through a tubular passageway 104 in the liquid supply tank 28 and through a tubular passageway 106 of rectangular cross-section in the hopper 32.

Figure 2:
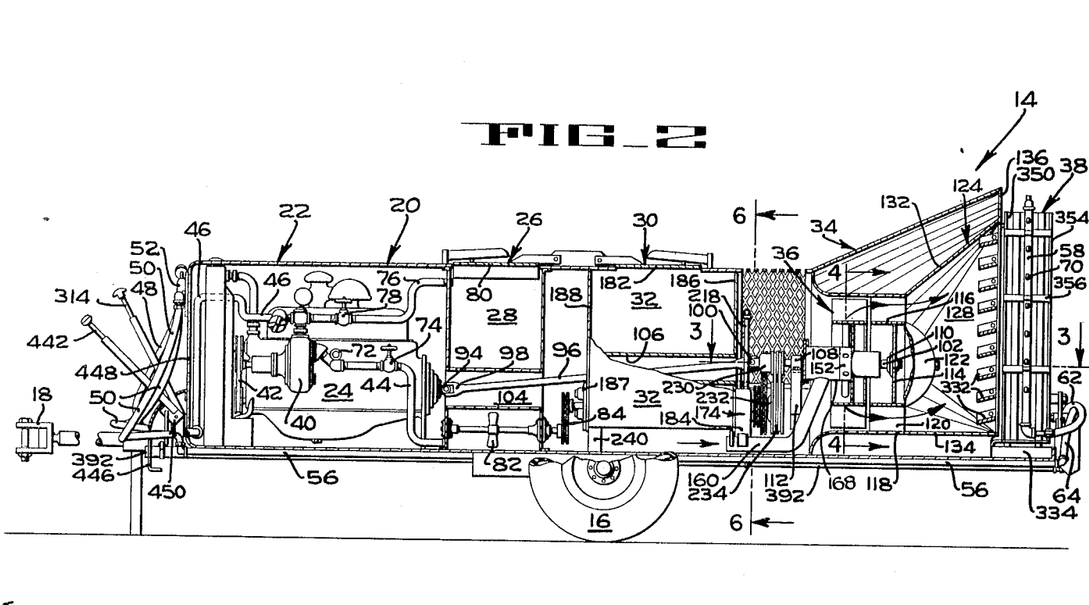
Fig. 2 is a side elevation of the apparatus of Fig. 1 with certain parts broken away.
Figure 3:
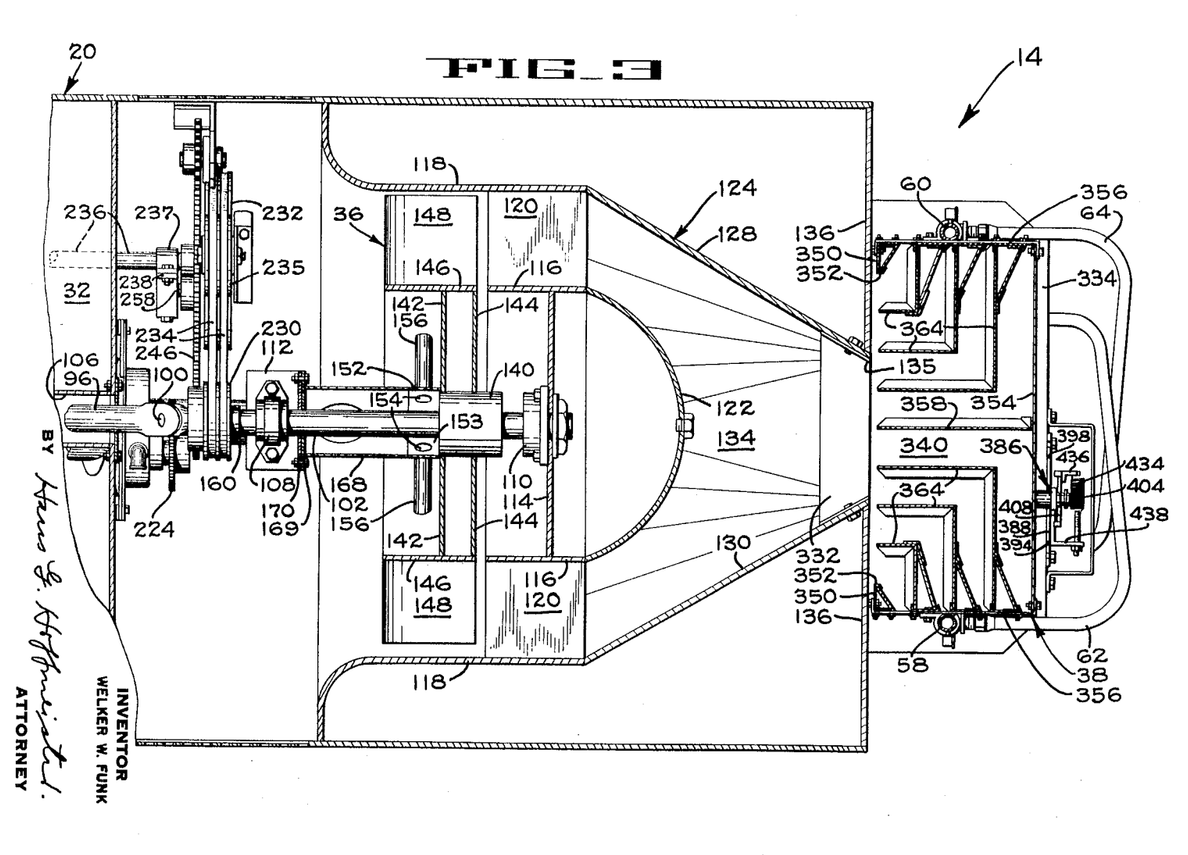
Fig. 3 is an enlarged horizontal section taken along lines 3—3 of Fig. 2.

The blower shaft 102 (Figs. 2 and 3) is mounted for rotation in bearings 108 and 110. The bearing 108 is bolted to a suitable support member 112 which is secured, as by welding, to the main body 20. The bearing 110 is bolted to a round, vertically extending plate 114 welded to the inner surface of a ring 116. The ring 116 is concentric with and is supported within a tubular air duct 118 by a plurality of radially extending, vortex straightening, fixed vanes 120. A dome shaped housing 122 is welded to the ring 116 to provide for a more streamlined air flow past the ring 116. The forward end of the air duct 118 is outwardly flared and is welded to the main body 20 as shown in Figs. 2 and 3. The circular rear end of the air duct 118 is integral with a restricting, upwardly flared nozzle 124 having inwardly tapered side walls 128 and 130, an upwardly flared top wall 132 (Fig. 2) and a horizontal bottom wall 134 which terminates in a vertically elongated rectangular discharge orifice 135. A transversely extending end plate 136, having an opening that is equivalent in size to the discharge orifice 135, is rigid with the surfaces which define the discharge opening 135 and with the rearmost edge of the blower compartment 34 thereby supporting the discharge end of the nozzle 124.

The blower 36 (Figs. 3 and 4) is of the axial flow type and comprises a hub 140 that is keyed on the blower shaft 102 and has a pair of circular plates 142 and 144 welded to the hub. A cylindrical shell 146, which is equal in diameter and is coaxial with the ring 116, is welded on the plates 142 and 144 and is positioned closely adjacent the ring 116. A plurality of equally spaced curved vanes 148 are welded on the outer surface of the cylindrical shell 146. The blower 36 is driven in the direction of the arrow A (Figs. 4 and 5) causing the vanes 148 to force a large volume of air through the duct 118 in the direction indicated by the arrows in Fig. 2. A plurality of holes 150 (Figs. 4 and 5) are drilled in the cylindrical shell 146 in such a manner that one hole is positioned on the suction side of each of the vanes 148. An inner cylindrical shell 152, positioned within and concentric with the shell 146, is welded to the plate 142 and cooperates with the hub 140 and plates 142 to define a dust receiving chamber 153. The shell 152 is provided with a plurality of angularly spaced holes 154, each of which is radially aligned with one of the holes 150 in the shell 146. A radially extending tube 156 is connected between each hole 154 and its radially aligned hole 150.

In order to direct, into the main air stream of the blower 36, dust which has been discharged from the hopper 32, an open ended tubular conduit 160 (Figs. 2 and 9) is connected to the bottom of the hopper 32 (Fig. 9) by means of a tab 162 welded on the conduit 160 and bolted to the hopper 32. Dust enters the conduit 160 through a slot 164 that receives dust from a metering device 174 which will be described presently. A horizontal, diametrically extending shelf 166, welded in the conduit under the slot 164, provides means for contacting and causing a more uniform dispersal of the dust in the conduit.

The conduit 160 extends upwardly and rearwardly from its inlet end and is connected to a tubular housing 168 (Figs. 2 and 3) mounted around the shaft 102 and concentric therewith. One end of the housing 168 is closely adjacent the tubular inner shell 152 and is held in position by support brackets 170 which are bolted to a plate 169 covering the other end of the housing 168 and to the support member 112.

When the blower 36 is in operation, a low pressure area is created rearwardly of each vane 148 around the holes 150 in the cylindrical shell 146. This low pressure area induces a flow of air rearwardly through the conduit 160, drawing dust from the hopper 32 and pulling it through the housing 168 and the dust receiving chamber 153, and thereafter through each of the radially extending tubes 156 into the main air stream of the blower.

In the present invention a unique arrangement, which is used for distributing dust into the conduit 160, provides an improved means of very accurately metering powdered material. Air is first introduced into the dust and is completely mixed or fluffed into the dust to change the physical characteristics of the dust from that of a pulverized solid to that of a liquid. This change to the physical characteristics of the materials is termed "fluidization" and causes the dust to flow like a fluid, i.e., the dust particles will seek a common level rather than adhere to each other to form a pile. Obviously such a change to the dust permits a more accurate control of the metering operation. For accomplishing the above fluidization of the dust, the metering device 174 (Figs. 6, 7 and 9) is mounted adjacent the lower end of the hopper 32 with certain parts extending longitudinally through the hopper.

The dust supply hopper 32 is provided with a rounded top 176 (Fig. 6) and two inwardly and downwardly directed side wall members 178 and 180 terminating in a rounded bottom that is positioned closely adjacent the bottom of the dust supply section 30 of the main body 20. A dust admittance door 182 in the top of the hopper 32 allows bags of dust to be dumped into the hopper 32 to fill the same.

The metering device 174 (Figs. 6, 7 and 9) includes a fluidizing housing 184 bolted externally on the lower portion of one end wall 186 of the hopper 32 and a dual bearing block 187 (Fig. 9) bolted to the other end wall 188 of the hopper 32. An agitator shaft 190 and a dust feed shaft 192 extend longitudinally through the hopper 32 and are mounted for rotation in spaced parallel relationship in the bearing block 187 and in bearings 196 in the housing 184. A tubular implement supporting bar 198 is fixed on the shaft 190, while a similar tubular implement supporting bar 200 is fixed on the shaft 192. A half turn, spirally formed agitating rod 202 is welded to pedestals 204 which are, in turn, welded on and extend radially outward from the bar 198. The agitating rod 202 extends over approximately one half of the length of the bar 198 and, when the shaft 190 and the bar 198 are rotated in a clockwise direction (Fig. 7), the rod 202 agitates the dust, breaks up lumps, and moves the dust toward the longitudinal center of the hopper 32. A helical vane 206 (Fig. 9) is also welded on the bar 198 with one end of the vane 206 projecting into a fluidizing chamber 208 in the housing 184. The helical vane 206 causes dust in the hopper 32 to move away from the housing 184, and because one end of the vane 206 projects into the chamber 208 the vane causes the excess fluidized material to be recirculated from the chamber 208 into the hopper 32 for each revolution of the shaft 190. In this way the fluidized material in the chamber 208 is maintained at a constant level.

A helically wound agitating rod 210 is mounted on the implement bar 200 by means of several radial pedestals 212 while a semicircular feed vane 214 is welded to the bar 200 in position immediately adjacent the housing 184. Rotation of the shaft 192 in a clockwise direction (Fig. 7)

causes the helical rod 210 (Fig. 9) to move the dust adjacent the bottom of the hopper 32 towards the housing 184 while the vane 214 positively feeds a small amount of dust into the fluidizing chamber 208 for each revolution of the shaft 192.

Figure 9:
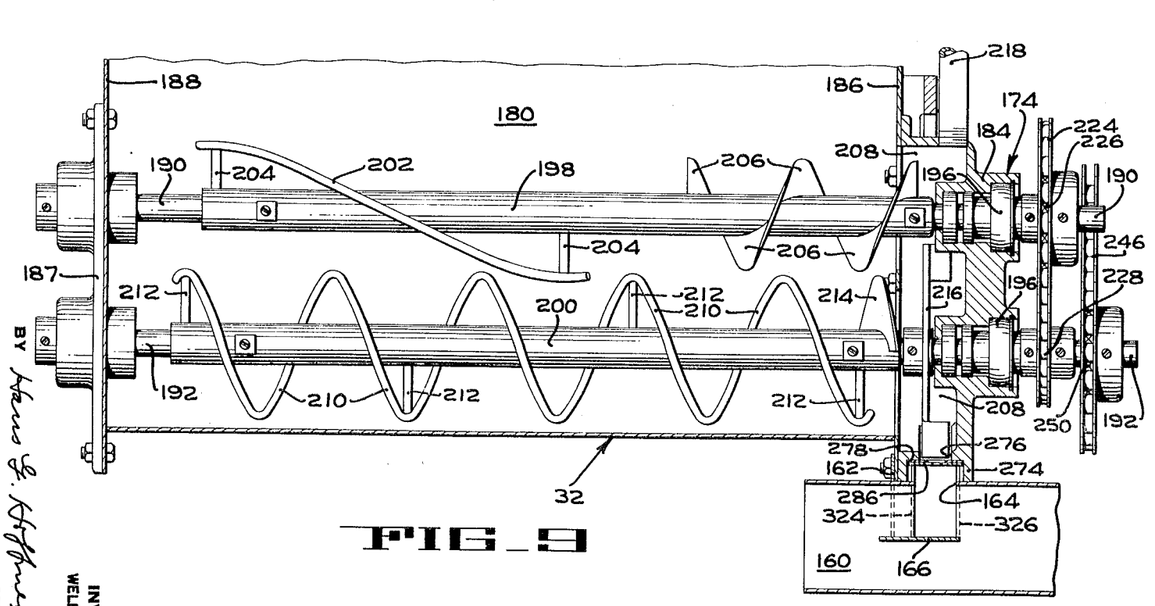
Fig. 9 is a section taken along lines 9—9 of Fig. 7.

A rotor 216 keyed to the shaft 192 is positioned in the fluidizing chamber 208 of the housing 184. When the shaft 192 is rotated, the rotor 216 aerates or fluidizes the dust by fluffing air into the dust. Although some air enters the fluidizing chamber through the dust in the hopper 32, it has been found that the dust in the hopper prevents air reaching the fluidizing chamber 208 in sufficient quantities. Because of this resistance to the entry of air into the fluidizing chamber 208, additional air is introduced directly into the chamber by means of a vent pipe 218 which is screwed into the upper end of the housing 184.

Figure 6:
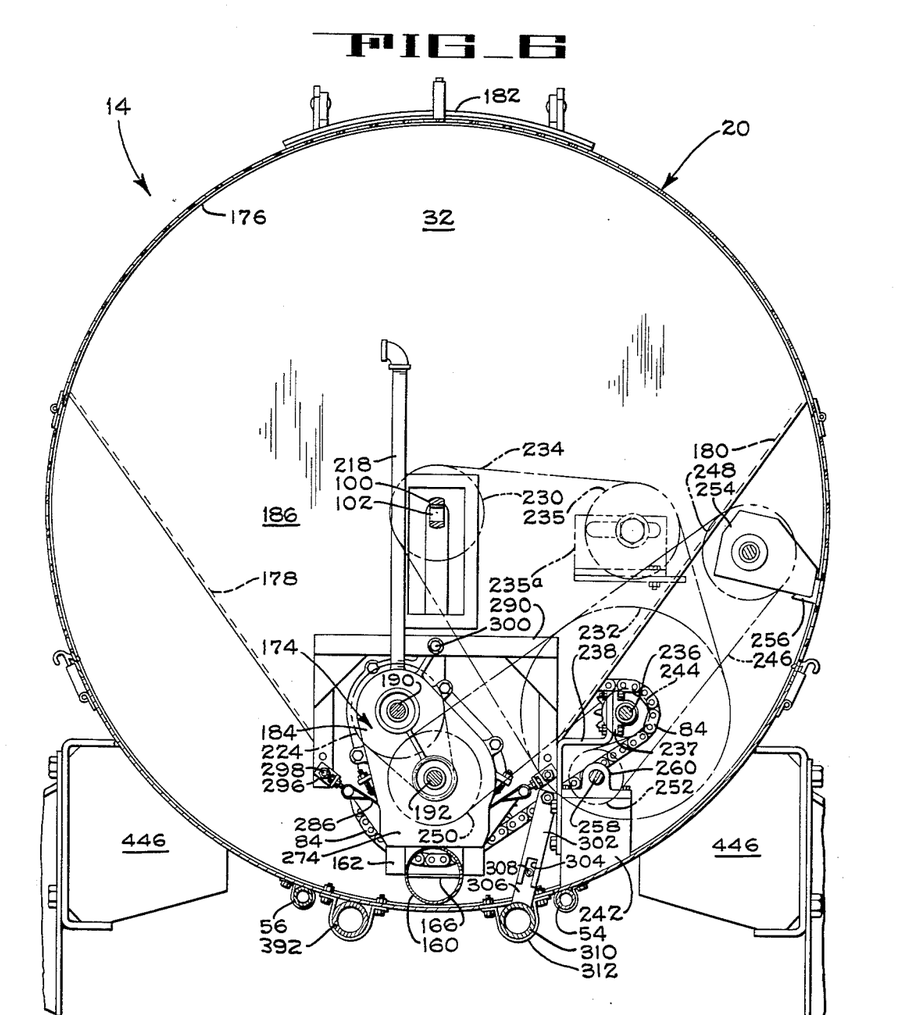
Fig. 6 is an enlarged section taken along lines 6—6 of Fig. 2.

The two shafts 190 and 192 are connected together by a chain 224 (Fig. 9) which is trained around sprockets 226 and 228 keyed to the shaft 190 and 192, respectively. The shaft 192 is driven from the blower shaft 102 (Figs. 2 and 3) through the following arrangement of drive parts. A drive sheave 230 which is keyed to the blower shaft 102 is connected to a driven sheave 232 by means of V-belts 234 and to an idler sheave 235 supported by a bracket 235a. The driven sheave 232 is keyed to a longitudinally extending idler shaft 236 which is mounted for rotation in bearings 237 (only one of which is shown in Figs. 3 and 6). The bearings 237 are bolted to brackets 238 which are, in turn, bolted on pedestals 240 (Fig. 2) and 242 (Fig. 6) which are rigidly secured to the main body 20. A sprocket 244 (Fig. 6) keyed to the idler shaft 236 drives a chain 246 which is trained around the sprocket 244, around an idler sprocket 252, around an idler sprocket 248 and around a sprocket 250 keyed to the shaft 192. The idler sprocket 248 is journalled for rotation in a bracket 254 bolted to an angle member 256 that is rigidly secured to the main body 20, as by welding. The idler sprocket 252 (Fig. 6) is keyed on a stub shaft 258 journalled for rotation in a bearing 260 bolted to the pedestal 242. The blower shaft 102 is driven in a clockwise direction as viewed in Fig. 6 and, consequently, the above described arrangement of parts causes the shafts 190 and 192 to be driven in a clockwise direction (Fig. 6). The aforementioned agitator 82 (Fig. 2) in the liquid supply tank 28 is driven from the idler shaft 236 by the aforementioned chain drive 84.

Figure 7:
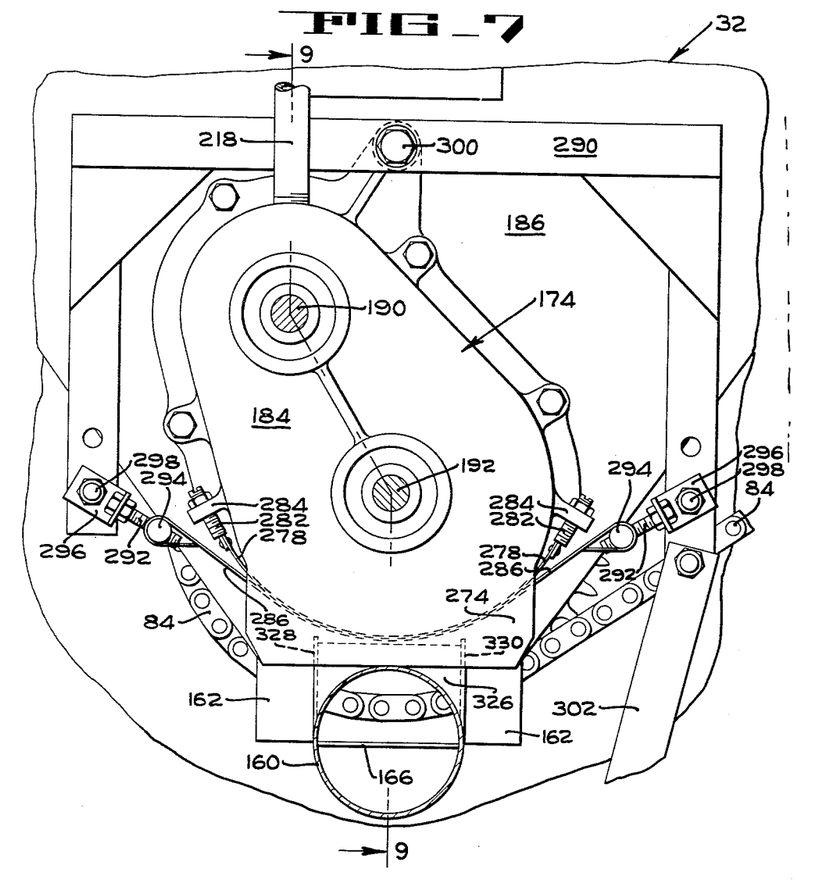
Fig. 7 is an enlarged view of a portion of the apparatus shown in Fig. 6.
Figure 8:
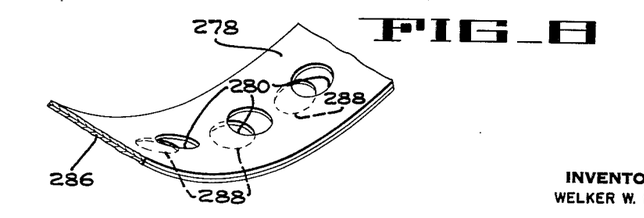
Fig. 8 is a perspective of a portion of the apparatus of Fig. 7.

The bottom or lower wall of the fluidizing housing 184 (Fig. 9) is in the form of an inverted channel 274 having a slot 276 extending longitudinally relative thereto. A resilient strap 278 (Figs. 7, 8 and 9) having a plurality of dust discharge holes 280 (Fig. 8) therein, is seated in the channel 274 with the holes 280 aligned with the slot 276. The strap 278 (Fig. 7) is held in place by bolts 282 riveted to each end of the strap and are connected to the housing 184 by tabs 284 integral with the housing 184. A similar strap 286 seated in sliding engagement against the strap 278 is provided with a plurality of holes 288 (Fig. 8) which are equal in size to the holes 280 in the strap 278. The ends of the strap 286 (Fig. 7) are pivotally connected to an inverted U-shaped rocker arm 290 by adjusting bolts 292. The bolts 292 are screwed in pivot rods 294 around which the ends of the strap 286 are wound. The heads of the bolts 292 are held by angle brackets 296 pivotally connected to the rocker arm 290 by bolts 298. The rocker arm 290 is pivotally connected to the upper end of the fluidizing housing 184 by a bolt 300. It can be seen that pivotal movement of the rocker arm 290 will cause the strap 286 to slide against the strap 278 whereby the effective area of the dust discharge opening, as defined by the cooperating relationship of the holes 280 and 288 (Fig. 8) can be selectively varied from full open to completely closed.

Figures 11, 12, 13:
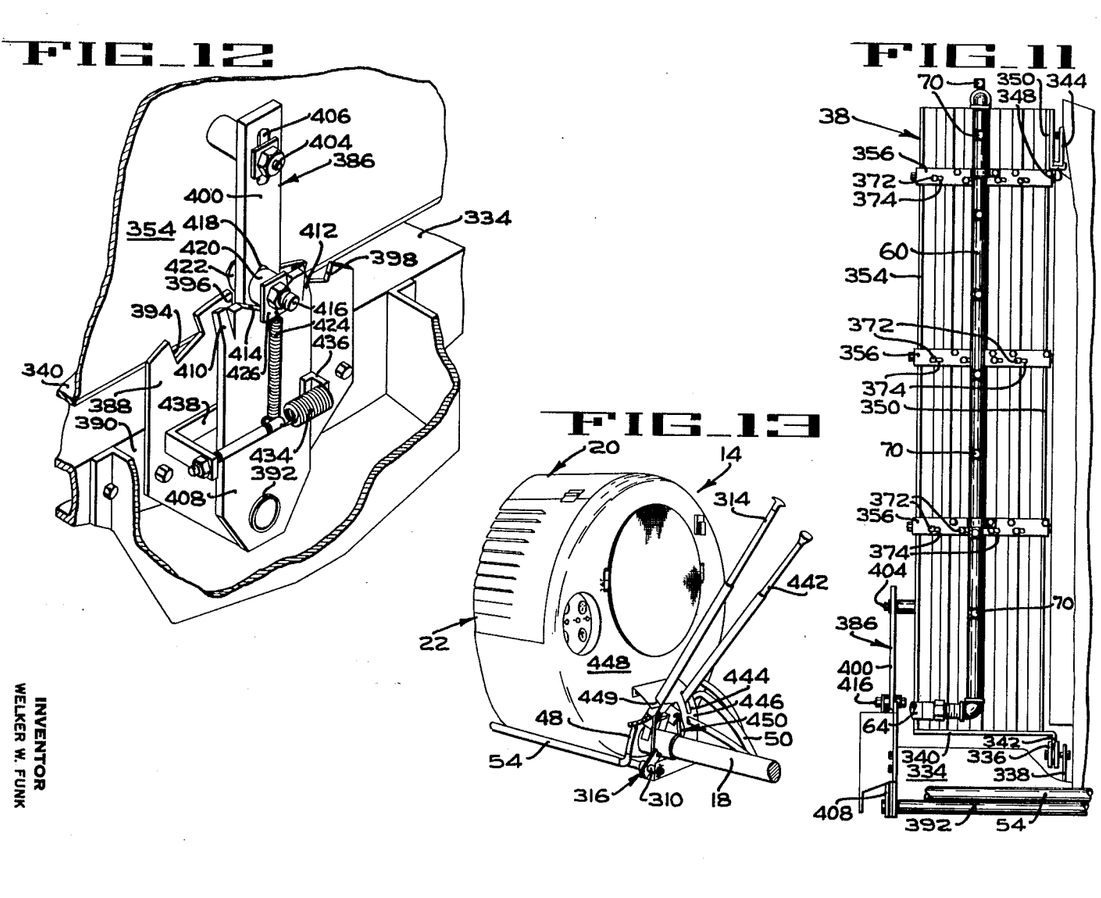
Fig. 11 is a side elevation of the discharge head of Fig. 10.
Fig. 12 is a perspective of the shifting and latching device for the discharge head.
Fig. 13 is a perspective of the front of the machine showing the controls for the apparatus.

The rocker arm 290 (Fig. 6) is pivoted about the bolt 300, by means of an arm 302 which has a slot 304 in one end and is rigidly bolted to the rocker arm 290. An actuating lever 306, having a roller 308 journalled adjacent one end and positioned to ride in the slot 304 is welded to one end of a control rod 310 which extends longitudinally of the apparatus 14 and terminates adjacent the forward end of the same. The control rod 310 is mounted for pivotal movement in several U-shaped brackets 312 bolted at spaced intervals to the outer surface of the main body 20. The control rod 310 is pivotally actuated by a feed control lever 314 (Fig. 13) which is pivotally mounted adjacent the forward end of the apparatus on the drawbar 18 and is connected to the control rod 310 by a linkage 316 so that pivotal movement of lever 314 causes rotation of the control rod. The lever 314 is so positioned as to be easily reached and controlled by the operator while in the tractor seat.

In order to guide the discharged fluidized dust from the holes 280 and 288 (Fig. 8) and through the slot 164 into the tubular conduit 160, end walls 324 and 326 are welded to the outer surface of the conduit 160 along the circumferential edges of the slot 164. The upper ends of the end walls 324 and 326 project within the area defined by the inverted channel 274 of the housing 184 and terminate closely adjacent the strap 286. Spaced side walls 328 and 330 (Fig. 7) are welded between the end walls 324 and 326 and to the horizontal edges of the slot 164. The upper end of the side walls 328 and 330 terminate in the inverted channel 274 closely adjacent the strap 286.

The metered dust is drawn through the tubular conduit 160 by the induced air flow therein and is evenly distributed into the blower air stream through the tubes 156 (Figs. 2 and 3) in the blower. The blast of dust laden air is then directed into the restricting nozzle 124 and past a plurality of horizontally disposed vanes 332. The vanes 332 are bolted to the side walls 128 and 130 immediately adjacent the discharge orifice 135. The vanes 332 can be adjusted to deflect the air at greater or lesser angles relative to the horizontal to direct the air into the discharge head 38 in the most appropriate direction for the particular crop being treated.

Figure 10:
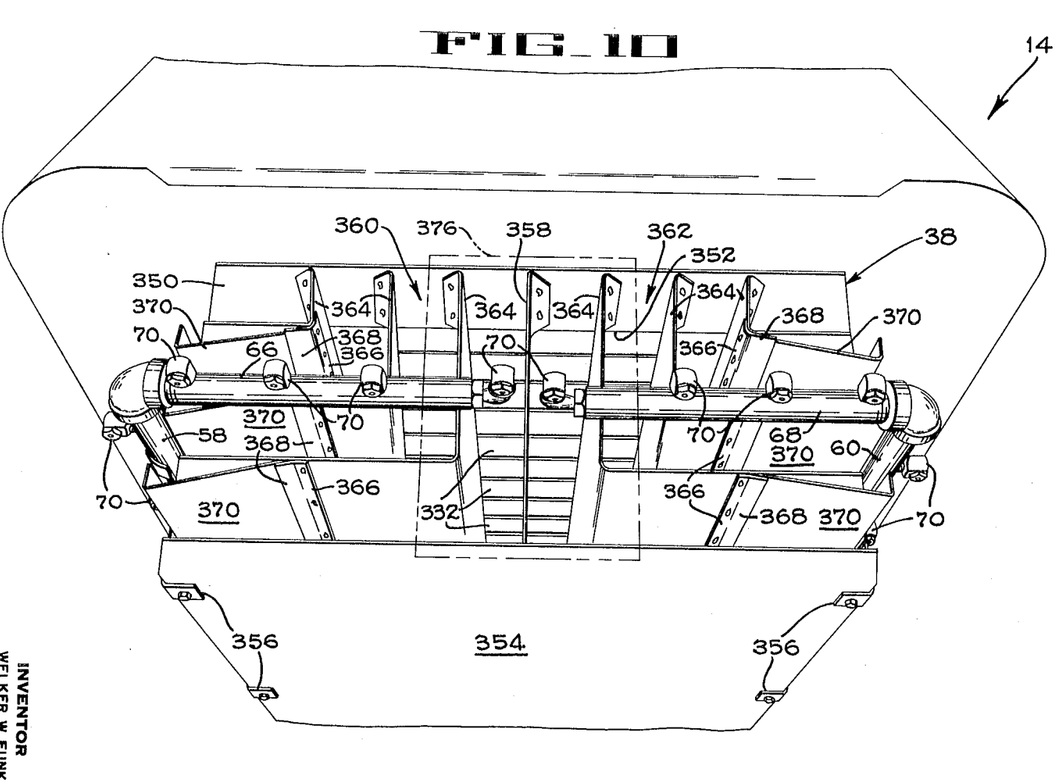
Fig. 10 is a perspective of a portion of the discharge head of the apparatus of the present invention.

The discharge head 38 (Figs. 3, 10 and 11) is mounted above a horizontal extension 334 of the main body 20 and is positioned rearwardly of the blower compartment 34. Several grooved rollers 336 (only one being shown in Fig. 11), spaced transversely of the body 20 in planar alignment, are mounted for rotation on a transversely extending bracket 338 which is secured, as by bolting, to the main body projection 334. The base of the discharge head 38 is in the form of a plate 340 having a downwardly turned lip 342 received in rolling engagement in the grooves formed in the rollers 336. The upper portion of the discharge head 38 is supported by means of an L-shaped guide block 344 bolted to the upper portion of the blower compartment 34. The lower end of the guide block 344 is in sliding engagement in a channel track 348 formed integrally with the forward wall 350 of the discharge head 38. The discharge head 38 is in this way mounted for lateral movement relative to the body 20.

The forward wall 350 has an opening 352 (Fig. 3) which is aligned with and is equal in height to the discharge orifice 135 of the restricting nozzle 124. The opening 352 is twice as wide as the discharge orifice 135 for reasons to be explained shortly. The forward wall 350 is connected to a parallel rear wall 354, of approximately the same overall size as the forward wall 350, by a plurality of U-shaped horizontally extending straps 356 which are bolted to the walls 350 and 354. The lower ends of the forward wall 350 and the rear wall 354 are welded to the base plate 340. A vertically extending, centrally located dividing member 358 (Figs. 3 and 10) welded between the forward wall 350 and the rear wall 354 serves to divide the discharge head 38 into two equal sections 360 and 362. Each section 360 and 362 is provided with three equally spaced L-shaped baffles 364 which are welded to the forward wall 350 and to the straps 356. A vertically extending angle member 366 is welded to each 
of the baffles 364 in such a manner that one leg 368 of the member 366 is angled away from its supporting baffle 364 and toward the straps 356. A vertically extending L-shaped deflecting vane 370 is provided for each baffle 364. One edge of each vane 370 is hinged in the cavity defined between the leg 368 and its associated baffle 364 while the other end of the vane 370 is secured in adjusted position to the straps 356 by bolts 372 (Fig. 11) which extend through slots 374 in the straps 356.

The vanes 370 can be adjusted into any one of a plurality of positions. For example, the lower ends of the vanes 370 can be locked in position to close the lower portion of the side discharge openings while the upper end of the vanes 370 may be locked in the full open position. With the vanes 370 set in this way, a larger proportion of the air blast will be discharged outwardly and upwardly therefrom, which pattern of discharge is desired when treating orchards.

If it should be desired to deflect the portion of the air blast which would normally be discharged directly above the center of the discharge head 38 outwardly from the sides thereof, a baffle 376 (shown in phantom in Fig. 10) is secured in any suitable way to the top of the discharge head 38. When treating row crops, the vanes 370 can be locked in a position where they close the upper portion of the side discharge outlet of the head 38 and open the bottom portion thereof. For this type of application, the entire upper surface of the discharge head 38 is closed by a plurality of baffles (not shown) which are similar to the baffles 376.

The discharge head 38 (Fig. 3) is arranged to be moved transversely into one of three predetermined positions relative to the discharge orifice 135 of the nozzle 124. The discharge head 38 can be centrally positioned relative to the orifice 135 so that an equal amount of air is discharged outwardly from each side of the head 38. The head 38 can be moved toward the right side (Fig. 10) of the apparatus 14 so that all the air is discharged through the section 360 of the head 38 which directs the air out the left side of the head 38, or conversely, the head 38 may be moved towards the left side of the apparatus 14 so that all the air will be discharged through the section 362 away from the right side of the machine. A shifting and latching device 386 (Fig. 12) is provided in order to move the discharge head 38 transversely into a selected one of these positions.

The shifting and latching device 386 comprises a quadrant 388 bolted to a vertical end surface 390 of the discharge head supporting extension 334. A longitudinally extending control rod 392 (Figs. 1 and 12) extends the full length of the apparatus 14 with the rear end received for pivotal movement in a hole in the lower portion of the quadrant 388. The upper edge of the quadrant 388 is arcuate and is provided with three radially spaced locking notches 394, 396 and 398. A shifting arm 400 is pivotally supported on the control rod 392 and is pivotally connected to the rear wall 354 of the discharge head 38 by a bolt 404 which is slidable in a slot 406 in the arm 400. An actuating lever 408 is rigidly secured to the control rod 392 in position immediately adjacent the shifting arm 400. The actuating lever 408 is wider than the arm 400 and has actuating lugs 410 and 412 on each upper corner of the lever 408 that project into the plane of the arm 400 to selectively contact and pivot the same in either direction about the axis of the control rod 392. A V-shaped camming surface 414 on the upper end of the lever 408 serves to cause vertical reciprocal movement of a locking bolt 416 which is supported for vertical movement in a slot 418 in the arm 400. A collar 420 on the bolt 416 rides on the camming surface 414 while a similar collar 422 on the bolt 416 rides on the upper surface of the quadrant 388 to selectively move into locking engagement with any one of the notches 394, 396 and 398 after being aligned therewith. A vertically extending spring 424 is connected between a connecting plate 426 on the bolt 416 and the lever 408. A horizontally disposed spring 434 is connected between a lug 436 welded to the lever 408 and to an L-shaped bracket 438 welded to the arm 400.

The spring 434 serves to compensate for the weight of a control lever 442 (Fig. 13) at the forward end of the apparatus 14 used for pivoting the control rod 392. The weight of the lever 442 tends to rotate the control rod 392 in a clockwise direction (Fig. 12) thus tending to cause the actuating lever 408 to pivot in the same direction. If this movement was not compensated for, the bolt 416 would be cammed upwardly to the unlocked position causing the entire discharge head 38 to move to its right hand position.

The discharge head control lever 442 (Fig. 2) is pivotally connected to the drawbar 18 at the forward end of the apparatus 14 in side by side relation with the feed control lever 314. Both of the levers 314 and 442 are extensible and may be adjusted to a length which will place them in position to be easily reached by the operator while he is driving the tractor. The lever 442 projects through a slot 444 (Fig. 13) in a curved bracket 446 bolted to the forward face 448 of the main body 20 and to the drawbar 18. The lever 314 projects through a similar slot 449 in the bracket 446. The bracket 446 is apertured to pivotally receive the forward end of the control rod 310 and the control rod 392 (Fig. 2). As previously mentioned, the linkage 316 (Fig. 13) pivotally connects the feed control lever 314 to the control rod 310. A similar linkage 450 (Fig. 2) is connected between the discharge head control lever 442 and the control rod 392 whereby a downward pivotal movement of the lever 442 will cause the control rod 392 to pivot in a clockwise direction as viewed in Fig. 12.

In the operation of the pesticide distributing apparatus 14 (Fig. 2) of the present invention, the apparatus is connected to a tractor (not shown) by means of the drawbar 18. The valves 52 are clamped to the seat or to any other suitable portion of the tractor so as to be easily reached by the operator when he is sitting on the tractor seat. Spray material is poured into the liquid supply tank 28 through the open door 80 and simultaneously therewith water is added to the tank 28. The water can be introduced into the tank either through the open door 80 or by utilizing the suction of the pump 40 as has already been described. The dust hopper 32 is filled by dumping bags of dust into the hopper 32 through the open door 182.

Although the apparatus can be used independently as a sprayer or as a duster, the description of the operation of the apparatus when used as an applicator of both liquid and dust simultaneously, i.e., as a liqui-duster, will suffice for all operations. After being loaded with spray material and dust, the pesticide distributing apparatus 14 is pulled to the area to be treated by the tractor (not shown) and the engine 24 is started, supplying the power for driving the pump 40, the blower 36, the agitator 82 and the metering device 174.

It will be assumed, first, that pesticide is to be applied to an orchard and that the pesticide is to be distributed evenly on both sides of the apparatus. The discharge head 38 is first moved to its central position by proper actuation of the lever 442. Both of the valves 52 are then turned on so that the liquid spray material is forced under pressure from the pump 40, through the hoses 48 and 50, through the pipes 54 and 56, through the hoses 62 and 64, and into the headers 58 and 60 (Fig. 10) and the horizontal extensions 66 and 68 of the same. This liquid spray material is thereafter discharged through the spray nozzles 70 into the blower air stream for entrainment therein.

The operator then actuates the lever 314 causing the rocker arm 290 (Fig. 7) of the metering device 174 to pivot, thereby moving the strap 286 relative to the strap 278 so that the holes 288 (Fig. 8) will be moved from a position spaced from the holes 280 to a position overlapping the holes 280. Since the fluidized dust in the fluidizing chamber 208 (Fig. 9) is always maintained at the same height by the helical vane 206, which withdraws excess material from the chamber 208, the pressure head on the fluidized dust in the chamber 208 is always substantially the same and is not affected by the amount or height of dust in the hopper 32. Hence, one setting of the lever 314 (Fig. 2) will assure the same rate of discharge of fluidized dust from the chamber 208 (Fig. 9) without requiring a number of special adjustments during the liqui-dusting operation to compensate for changes in the heights of the dust in the hopper 32.

The fluidized dust is discharged from the metering device 174 through the overlapping holes 280 and 288 and thereafter falls into the conduit 160. The suction induced flow of air through the conduit 160 entrains the dust and draws it into the chamber 153 (Fig. 3), between the inner shell 152 and the hub 140 of the blower 36. While in the chamber 153, the fluidized dust is evenly distributed and flows out of the chamber 153 through the radial tubes 156 and into the main air stream of the blower 36. The dust laden blast of air is then forced through the restricting nozzle 124 and past the vanes 332 into the discharge head 38. When in the head 38, the dust laden air is evenly divided into four separate lanes defined by the dividing member 358 and the two closest L-shaped baffles 364 on each side of the dividing member 358. This division of the main air blast prevents concentration of the dust against the air blast turning surfaces in the head and results in a more uniform distribution of the dust in the air blast.

With the vanes 370 set for orchard operation, i.e., closed at the bottom and opened a desired amount at the top, a greater portion of the dust laden air is directed through the upper part of the head 38 than through the lower part of the head 38. Thus, a greater portion of the pesticide is directed toward the large upper portion of the trees where it is needed than toward the trunk of the tree. If it should be desired to prevent the dust laden air from flowing out of the central upper portion of the head 38, the baffle 376 (Fig. 10) is used. As the dust laden air moves outwardly from the discharge head 38 past the nozzles 70, the liquid spray material emitted therefrom is entrained in the dust laden air blast and in this way is carried to the trees in the orchard.

If the operator should desire to liqui-dust trees on only one side of the pesticide distributing apparatus 14, the operator first closes the valve 52 (Fig. 2) associated with the spray nozzles 70 on the other side of the apparatus to prevent fluid from flowing through the nozzles 70 on that side of the machine. The operator then actuates the lever 442 to move the head away from the side to be treated so that the entire air blast will be directed out of the head 38 past all the baffles 364 (Fig. 10) and past all the vanes 370 on the particular side of the dividing member 358 which directs the pesticide towards the proper side of the apparatus.

Because of the self-locking and self-releasing characteristics of the shifting and latching device 386 (Fig. 12), the operator can easily and rapidly accomplish the lateral shifting of the head 38 to any of its three positions of adjustment without moving away from his operating position on the tractor seat.

If row crops are to be treated, the entire top of the discharge head 38 is closed by the baffle 376 (Fig. 10) and other baffles (not shown) which are similar to the baffle 376. The deflector vanes 370 are then repositioned relative to their associated baffles 364 so that the upper portion of the side outlets are closed and the lower portions are open. Hence, the air blast will then be directed outwardly and downwardly. In this type of application, the nozzles 70 on the horizontal extensions 66 and 68 of the headers 58 and 60 can be removed and the extensions 66 and 68 plugged to prevent discharge of fluid therefrom.

It is apparent from the foregoing description that the apparatus of the present invention is a versatile apparatus which can be used to apply pesticides, or the like, in the forms of sprays, dusts, or the combination of sprays and dusts, to both orchards and row crops. The apparatus includes an improved metering device for fluidizing dust to provide an even and accurately controlled distribution of the same. The metering device is arranged so that the amount of dust that is introduced into the air stream for one setting of the metering holes will be unaffected by the height of the dust in the hopper. Also included in the apparatus is an improved discharge head which is arranged to be moved laterally of the apparatus and has certain baffles which may be repositioned to obtain many different types of discharge patterns. A unique shifting and latching device for moving the discharge head transversely of the distributing apparatus is also included in the apparatus of the present invention.

While one embodiment of the present invention has been shown and described, it will be understood that various changes and modifications may be made without departing from the spirit of the invention or scope of the appended claims. Having thus described the present invention and the manner in which the same is to be used, what is claimed as new and desired to be protected by Letters Patent is:

1. In an apparatus for distributing agricultural chemicals, a hopper for powdered material, a blower adjacent said hopper, a housing connected to said hopper for receiving the powdered material from said hopper, said housing having a lower wall with an opening therethrough through which the material is discharged, means connected to said housing for venting said housing directly to the atmosphere to provide an unobstructed flow of air thereinto, a power driven rotor in said housing for fluffing air into said powdered material to fluidize the same, adjustable discharge control means disposed over the opening in the lower wall of said housing for regulating the amount of fluidized material discharge therefrom, and means connected between said housing and said blower for directing the fluidized material into the air stream of said blower.

2. In an apparatus for distributing agricultural chemicals, a hopper for powdered material, a blower adjacent said hopper, a housing connected to said hopper and arranged to receive the powdered material from said hopper, said housing having a lower wall with an opening therethrough therein for discharging material therethrough, means connected to said housing for venting said housing directly to the atmosphere to provide an unobstructed flow of air thereinto, a power driven rotor in said housing for fluffing air into said powdered material to fluidize the same, a band clamped over the opening in the lower wall of said housing, said band having a hole communicating with said housing, a second band having a hole therein and being slidably engaged with said first band for movement from a position where said holes in the first and second bands are spaced from each other to prevent fluidized material from flowing out of the housing to any of a range of positions where said holes are overlapped different amounts to allow fluidized material in controlled quantities to flow from said housing, and means connected between said housing and said blower for directing the powdered material into the air stream of said blower.

3. In an apparatus for distributing agricultural chemicals, a hopper for powdered material; a metering housing connected to said hopper for receiving the powdered material from said hopper, said housing having a lower wall with an opening therein for discharging the material; means connected to said housing for venting said housing directly to the atmosphere to provide an unobstructed flow of air thereinto; a power driven rotor in said housing for fluffing air into said powered material to fluidize the same; a power driven blower adjacent said hopper and having an inner cylindrical shell defining a dust receiving chamber and an outer cylindrical shell, a plurality of air propelling vanes secured to said outer shell and projecting outwardly therefrom, a plurality of radially extending tubes connecting said chamber to the space outward of said outer shell at a point adjacent the low pressure side of said vanes; and a conduit connecting the discharge opening of said metering housing to said chamber for directing a stream of air within which the powdered material is entrained from the metering housing to said chamber, said radial tubes being arranged to distribute equal quantities of the entrained powdered material into the main air stream of said blower.

4. In an apparatus for distributing agricultural chemicals, a hopper for powdered material, a metering housing communicating with said hopper for receiving the powdered material from said hopper, said housing having a lower wall with an opening for discharging the material, means connecting to said housing for venting said housing directly to the atmosphere to provide an unobstructed flow of air thereinto, a power driven rotor in said housing for fluffing air into said powered material to fluidize the same, a power driven innner cylindrical shell to define a dust receiving chamber, an outer cylindrical shell carried by said inner shell, a plurality of blower vanes on said outer shell and projecting outwardly therefrom, a plurality of radially extending tubes connecting said chamber to the space outwardly of said outer shell at a point adjacent the low pressure side of the vanes, a tubular housing having an open end in communication with said inner shell and being coaxial with and the same size as said inner shell, a conduit connected at one end to said tubular housing and to the discharge opening in said metering housing at a point adjacent the other end to receive fluidized material from said metering housing, said other end of said conduit being open to the atmosphere, said radial tubes cooperating with said conduit and said tubular housing and said chamber to define flow passages through which air is conducted from the open end of the conduit to the low pressure area of the said vanes to entrain the fluidized dust therein and to direct equal quantities of said dust through said tubes and into the main air stream of said vanes.

5. In an apparatus for distributing agricultural chemicals having a hopper for powdered materials, a metering device comprising a metering housing connected to said hopper for receiving powdered material therefrom, means connected to said housing for venting said housing directly to the atmosphere, a first shaft rotatable in said hopper and in said housing and positioned adjacent the bottom thereof, a helical agitator rod on said shaft and arranged upon rotation of said shaft to agitate the powdered material to direct it toward said housing, a helical feed vane on said shaft immediately adjacent said housing and arranged to force some of the powdered material from the hopper into the housing for each rotation of the shaft, a rotor on said shaft positioned in said housing and arranged upon rotation of said shaft to fluff air into the powdered material in the housing to fluidize the same, a second shaft rotatable in said hopper and in said housing and positioned above said first shaft, a helical vane on said second shaft projecting into said housing and arranged upon rotation of said second shaft to return to said hopper fluidized material in the portion of said housing above said rotor, and a helical agitating vane on said second shaft and arranged upon rotation of said second shaft to agitate the powdered material and to direct it toward said housing.

6. In an apparatus for distributing agricultural chemicals, a cylindrical body having a hopper for powdered material, a housing communicating with said hopper for receiving powered material therefrom, means connnected to said housing for venting said housing to the atmosphere, means in said housing for fluffing air from said venting means into said powered material to fluidize the same, a blower adjacent said hopper and arranged to create an air blast, means for directing fluidized dust from said housing into said air blast, a restricting nozzle adjacent said blower having an elongated discharge orifice and arranged to restrict the air stream of said blower and direct the same through said elongated discharge orifice, a discharge head mounted immediately adjacent said discharge orifice to receive the material-laden air stream, said head being arranged for lateral adjustment relative to said discharge orifice, said discharge head having an inlet opening aproximately twice as wide as said nozzle discharge orifice, a plurality of vertically extending baffles in said discharge head arranged to deflect the air outwardly from one side or both sides of said discharge head depending upon the lateral position of said discharge head, and means carried by said body and operatively connnected to said discharge head for moving the same laterally of said discharge orifice.

7. In an apparatus for distributing agricultural chemicals, a cylindrical body having a hopper for powdered material, a housing connected to said hopper for receiving the powdered material, means connected to said housing for venting said housing to the atmosphere, means in said housing for fluffing air from said venting means into said powdered material to fluidize the same, a blower adjacent said hopper and arranged to create an air blast, means connected to said housing for directing fluidized dust into said air blast, a restricting nozzle adjacent said blower having an elongated discharge orifice and arranged to restrict the air stream of said blower and discharge the same through a vertically elongated discharge orifice, a discharge head mounted immediately adjacent said discharge orifice to receive the material laden air blast and arranged to be adjusted laterally relative to said discharge orifice, said discharge head having an inlet opening approximately twice as wide as said nozzle discharge orifice, a vertically extending dividing member in said head, a plurality of vertically extending baffles in said head on each side of said dividing member and arranged to direct the air blast upwardly away from the top of said head and outwardly from the sides of said head, and means carried by said body and operatively connected to said discharge head for moving the same laterally of said discharge orifice from a position remote from said head.

8. In an apparatus for distributing agricultural chemicals, a cylindrical body having a hopper for powdered material, a housing connected to said hopper for receiving the powdered material, means connected to said housing for venting said housing to the atmosphere, means in said housing for fluffing air from said venting means into said powdered material to fluidize the same, a blower adjacent said hopper and arranged to create an air blast, means connected to said housing for directing fluidized dust into said air blast, a restricting nozzle adjacent said blower having an elongated discharge orifice and arranged to restrict the air stream of said blower and direct the same through a vertically elongated discharge orifice, a discharge head mounted immediately adjacent said discharge orifice to receive the material laden air blast and arranged to be adjusted laterally relative to said discharge orifice, a vertically extending dividing member in said head, a plurality of vertically extending baffles on each side of said dividing member and arranged to direct the air blast upwardly through the top of said head and outwardly from the side of said head, a deflecting vane hinged on each of said baffles and adjustable relative to the baffle to be moved through a range of positions from full open to full closed, each of said vanes being arranged to be canted relative to its associated baffle to define a vertically elongated side opening of different width from the bottom to the top, and means carried by said body and operatively connected to said discharge head for moving the same laterally of said discharge orifice from a position remote from said head.

9. An apparatus for distributing agricultural chemicals comprising a cylindrical body divided successively from end to end into an engine compartment having an engine therein, a dust supply section for holding powdered material therein, and a blower compartment having a blower therein operatively connected to said engine, spaced frame-like extensions carried by said body to project longitudinally from the end thereof adjacent said blower compartment, a discharge head mounted on said extensions for movement thereon transversely of said body, means carried by said body and operatively connected to said discharge head to move the latter transversely of said body, said dust supply section including a hopper for holding the powdered material, and means vented directly to the atmosphere and connected to said hopper for receiving the powdered material from said hopper and fluidizing the received powdered material, conduit means connecting said vented means and said blower for conducting the fluidized material from said vented means to said blower, and means connected to said conduit means for directing the fluidized material into the air stream created by said blower.

10. An apparatus for distributing agricultural chemicals comprising an elongate body, ground engaging wheels mounted directly on said body intermediate its ends, said body divided successively from one end to the other into separate sections including an engine compartment having an engine therein, a dust supply section and a blower compartment having a blower therein; spaced frame-like extensions carried by said body to project longitudinally from the end thereof adjacent said blower compartment, a discharge head mounted on said extensions for movement laterally of said body, a hopper for powdered material in said dust supply section, a housing connected to said hopper for receiving the powdered material from said hopper, means connected to said hopper for venting the hopper directly to atmosphere, power driven means disposed in said housing and operatively connected to said engine for fluffing air into said powdered material to fluidize the same, said housing having means through which the fluidized material is discharged, means connected between said discharge means in said housing and said blower for directing the fluidized material into the air stream created by said blower, and means connected between said blower and said discharge head for conducting the fluidized material laden stream from said blower to said discharge head.

References Cited in the file of this patent

UNITED STATES PATENTS

| | | |
|---|---|---|
| 2,706,596 | Hait | Apr. 19, 1955 |
| 2,770,069 | Bowie | Nov. 13, 1956 |
| 2,770,070 | Funk | Nov. 13, 1956 |
| 2,792,255 | Bellows | May 14, 1957 |
| 2,828,158 | Patterson | Mar. 25, 1958 |

FOREIGN PATENTS

| | | |
|---|---|---|
| 137,741 | Sweden | Oct. 21, 1952 |